United States Patent
Kusters et al.

(10) Patent No.: US 6,667,352 B1
(45) Date of Patent: Dec. 23, 2003

(54) LATEX PARTICLES BASED ON A VINYL ACETATE ETHYLENE COPOLYMERIZATE PROCESSES FOR THE PRODUCTION THEREOF AND THE USE THEREOF

(75) Inventors: Jos M. H. Kusters, Puth (NL); Robert Koelliker, Oberkirch (CH); Florin I. Vlad, Annandale, NJ (US); Wendy J. Cook, Sutton (GB)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/831,418

(22) PCT Filed: Nov. 19, 1999

(86) PCT No.: PCT/EP99/08892
§ 371 (c)(1),
(2), (4) Date: Jul. 26, 2001

(87) PCT Pub. No.: WO00/31159
PCT Pub. Date: Jun. 2, 2000

(30) Foreign Application Priority Data

Nov. 19, 1998 (DE) .......................... 198 53 461

(51) Int. Cl.$^7$ ............................... C08L 83/00
(52) U.S. Cl. ...................... 523/201; 524/503; 524/522; 524/523; 524/524
(58) Field of Search ................. 523/201; 524/503, 524/522, 523, 524

(56) References Cited

U.S. PATENT DOCUMENTS

| | | | |
|---|---|---|---|
| 3,644,262 A | 2/1972 | Stehle et al. | 260/29.6 R |
| 4,118,356 A | 10/1978 | Devona et al. | 260/29.6 RB |
| 4,164,489 A | 8/1979 | Daniels et al. | 260/29.6 R |
| 4,975,320 A | 12/1990 | Goldstein et al. | 428/288 |
| 5,073,578 A | 12/1991 | Boodaghains et al. | 523/201 |

FOREIGN PATENT DOCUMENTS

| | | | |
|---|---|---|---|
| EP | 0 795 591 | 9/1997 | C09D/151/00 |

*Primary Examiner*—Bernard Lipman
(74) *Attorney, Agent, or Firm*—Charles W. Almer

(57) ABSTRACT

The invention relates to protective colloid-stabilized copolymerizate latex particles with a heterogeneous morphology based on a vinyl acetate-ethylene copolymerizate and optionally further monomers, the latex particles having an ethylene content of less than 30 wt. %, based oh the total monomer quantity, comprising an outer phase with a polymer of vinyl acetate and approximately 0 to 40 wt. % ethylene, based on the monomers of the outer phase, and an inner phase with a polymer of vinyl acetate and approximately 0 to 40 wt. % ethylene; based on the monomers of the inner phase and in which at least one of the two phases contains ethylene. The invention also relates to a process for the preparation of acqueous dispersions of copolymerizate latex particles with heterogeneous morphology and the use thereof. The invention is characterized in that the heterogeneous morphology can be obtained in a planned manner, i.e. whether there is a core-shell or inverse core-shell morphology and the composition of the inner and the outer phases can also be varied in flexible manner within the indicated ranges.

26 Claims, No Drawings

US 6,667,352 B1

LATEX PARTICLES BASED ON A VINYL ACETATE ETHYLENE COPOLYMERIZATE PROCESSES FOR THE PRODUCTION THEREOF AND THE USE THEREOF

FIELD OF THE INVENTION

The invention relates to protective colloid-stabilized copolymerizate latex particles with heterogeneous morphology based on a vinyl acetate-ethylene copolymerizate, processes for the production thereof and the use thereof.

BACKGROUND OF THE INVENTION

For some time now copolymerizates in the form of stabilized, aqueous polymerizate dispersions (latices) or preferably as redispersible powders have been increasingly used for modifying mineral building materials. As a result of such additives the characteristics profiles of mineral building materials, such as mortar, concrete, etc. can be controlled in a planned manner and the copolymerizates can be based on the most varied monomers. The modifying action is based less on the chemical characteristics of the copolymerizate used than on its physical characteristics. In particular, copolymerizates based on the monomers vinyl acetate and ethylene have particular advantages as modifying additives in the building sector, for hydraulically setting systems.

The production of so-called heterogeneous latex morphologies is of interest in this connection. Due to their molecular structure such latex particles have special characteristics, which not only permit their universal use, but also a more planned setting of the desired characteristics. In this heterogeneous structure of the latex particles, a distinction is in each case made between a relatively hydrophobic and a relatively hydrophilic area. For thermodynamic equilibrium reasons, under normal conditions there is frequently a hydrophilic shell (outer phase) and a hydrophobic core (inner phase), because this structure can generally be more easily produced by a conventional emulsion polymerization. However, it is much more difficult to produce systems having a so-called inverse core-shell structure, in which firstly the shell and then the core are produced. This is more particularly the case when performing so-called pressure polymerizations, if e.g. ethylene is used.

Please note that the core-shell morphology as described herein, is not a stabilized latex particle known in the art, wherein a protective colloid or surfactant is arranged on the surface of the polymer particle to stabilize it in an additional phase. In contrary, the polymer particle itself should be structured in the present invention, i.e. should have a heterogeneous morphology.

Apart from aqueous polymer dispersions, a further very appropriate application form of the polymer additive acting in a modifying manner is a redispersible powder available from such dispersions by drying. These powders are, due to their easy handling, easier, space-saving transportation, easier dosability and less expensive storage, very advantageous. Due to the readily available dispersing medium "water", the powder form is also desired in this respect.

The prior art provides numerous publications dealing with vinyl acetate-ethylene copolymers and which in part would result in redispersible powders. For example, EP 444 827 A1 describes copolymer particles with a core-shell structure, in which the Tg-value is in the range 0 to −30° C. and the core, apart from 10 to 30 wt. % alkylene and 1 to 10 wt. % alkylacrylate, also contains 10 to 60 wt. % vinyl alkanoate, 10 to 40 wt. % vinyl esters having a specific chemical formula and 0.1 to 5 wt. % vinyl silane. The particles are used in the form of copolymer emulsions for pigmented surface coatings.

However, a dispersible powder is not described.

The 1969 DE-OS 2 055 978 relates to the preparation of a water-based gloss paint, which contains a vinyl acetate-ethylene copolymerizate as the binder. The copolymerizate is produced by (1) preparing an aqueous polymerization starting medium with water, catalyst and a small amount of vinyl acetate, (2) polymerizing the vinyl acetate, (3) introducing ethylene into the reaction mixture in order to obtain a pressure in the range 3.5 to 105 atü, as well as the gradual addition of vinyl acetate and an acrylamide and polymerizing both monomers in the presence of the previously formed polyvinyl acetate at a temperature of 40 to 90° C., (4) releasing the overpressure, (5) adding a water-soluble emulsifier and a small amount of an alkyl acrylate and (6) polymerizing the alkyl acrylate in the presence of the polymer dispersion obtained. A surfactant can optionally be present in the first polymerization stage. However, this cannot produce a heterogeneous morphology. In addition, only dispersions, but not redispersible powders are described.

According to the disclosure of EP 757 065 A3 a protective colloid-stabilized copolymerizate is prepared, which has a glass transition temperature of −40° C. to 10° C., as well as an ethylene content of at least 30 wt. %, based on the total quantity of the monomers, the heterogeneous structure of the copolymer particles containing a first copolymerizate phase with vinyl acetate and >40 wt. % ethylene, based on the total monomer quantity in this phase and a final copolymerizate phase with vinyl acetate and 5 to 40 wt. % ethylene, based on the total monomer quantity in this phase.

The process for the production of this copolymerizate is based on the polymerization of vinyl acetate and ethylene and optionally further comonomers, part of the monomers undergoes radical copolymerization at an ethylene pressure of 55 to 150 bar in the presence of a protective colloid, optionally further monomers are polymerized and then, under an ethylene pressure between 1 and 55 bar, further radical copolymerization takes place. The copolymerizates described are used in the form of dispersions or redispersible powders as binders in building materials or sealing sludges.

The problem of the invention is to further develop the previously described vinyl acetate-ethylene copolymerizate latex particles or the aqueous dispersions obtained in such a way that, whilst retaining advantageous characteristics, or in individual cases even better characteristics, a heterogeneous morphology is obtained in the latex particles. In addition, the copolymerizate latex particles are to be improved in that in their final applications, such as e.g. in plastics-containing, cement-bonded systems, due to the desirable successive reactions, they lead to improved use products. Apart from the aqueous dispersions, redispersible powders are to be accessible, which substantially maintain their advantageous characteristics following redispersion in the aqueous medium. In addition, a process is to be provided, which permits the planned setting and modification of the heterogeneous morphology of latex particles, also when performing a pressure emulsion polymerization.

SUMMARY OF THE INVENTION

According to the invention, this problem is solved by protective colloid-stabilized copolymerizate latex particles with a heterogeneous morphology based on a vinyl acetate-ethylene copolymerizate and optionally further monomers, the latex particles having an ethylene content of less than 30 wt. %, based on the total monomer quantity, comprising an outer phase with a polymer of vinyl acetate and approximately 0 to 40 wt. % ethylene, based on the monomers of the outer phase, and an inner phase with a polymer of vinyl acetate and approximately 0 to 40 wt. % ethylene, based on the monomers of the inner phase and in which at least one of the two phases contains ethylene.

DESCRIPTION OF THE INVENTION

Copolymer latex particles with heterogeneous morphology and a total ethylene content of less than 30 wt. %, based on the total monomer quantity are made available, the ethylene content in the individual phases being in the range approximately 0 to 40 wt. %, based on the monomers of the particular phase. A polymer with ethylene content need not simultaneously be present in both phases and instead, for bringing about the characteristics according to the invention, it is sufficient if one of the two phases only contains a vinyl acetate homopolymer, optionally a vinyl acetate copolymer without ethylene.

It is important for solving the aforementioned set problem for the indicated weight quantities to be maintained. In particular, based on the total monomer quantity, the ethylene content must be below 30 wt. %. Preferably the ethylene content is between approximately 2 and 30 and in particularly preferred manner between approximately 5 and 25 wt. %, based on the total monomer quantity.

Through the choice and quantity of the monomers used, i.e. vinyl acetate, ethylene and optionally further monomers, the desired characteristics can be set in a planned manner. For example, the glass transition temperature Tg of the copolymerizate latex particles according to the invention can be varied. The weight proportions of the different monomers is in simple manner chosen in such a way that the glass transition temperature Tg (mid-point temperature according to ASTM D 3418-82) of the film formation of the latex particles to be used correspondingly has the modifying action, a range of −70 to +110° C. being possible. The glass transition temperature can e.g. be measured by DSC methods or determined theoretically by calculation in accordance with the Fox equation (T. G. Fox, Bull. Am. Phy. Soc. (ser II), 1, 123 (1956) and Ullmann's Enzyklopadie der Technischen Chemie, vol. 19, 4th edition, Verlag Chemie, Weinheim, 1980, pp 17/18). In the present invention the glass transition temperatures are determined by differential scanning calorimetry (DSC).

Preferably, in the protective colloid-stabilized copolymerizate latex particles according to the invention, the outer and inner phases have different glass transition temperatures Tg. In particular, the harder phase, i.e. the hydrophilic phase, has a glass transition temperature Tg of approximately 20 to 35° C. and the softer or hydrophobic phase a Tg of approximately −40 to +20° C.

According to a preferred embodiment, the weight ratio of the inner to the outer phase is between 95:5 and 5:95, particularly between approximately 75:25 and approximately 40:60. By setting the weight ratio of the inner to the outer phase it is also possible to influence the characteristics to be obtained. For example, in a copolymerizate latex particle an outer phase essentially formed from vinyl acetate monomers in the applications envisaged leads to a better adhesion, e.g. to wood.

Further monomers may optionally be present in one or both phases besides ethylene and vinyl acetate monomers. There are no restrictions within the scope of the invention concerning the choice of monomers. The further monomers can be in the form of aliphatic vinyl ($C_3$–$C_{20}$)-carboxylic esters, ($C_1$–$C_{20}$)-acrylic esters, methacrylic esters, optionally substituted with epoxy and/or hydroxyl groups, maleic diesters of aliphatic ($C_1$–$C_{20}$)-alcohols, sulphonate or sulphonic acid group-carrying monomers, $\alpha,\beta$-unsaturated carboxylic acids, N-methylol group-carrying monomers, ($C_1$–$C_{20}$)-alkenyl (meth)acrylic esters, cationic monomers, crosslinking monomers in the form of radical reacting di- and/or triolefins. This list is not exhaustive and the expert is aware of further copolymerizable monomers which are suitable here.

Additionally at least one ionic monomer is preferably contained in the outer phase. This leads to a rise in the hydrophilicity of this phase. The term "ionic monomer" is not particularly restricted, provided that it is a monomer with one or more positive or negative functionalities in the molecule. These are e.g. monomers with cationic functionality, such as are attributed to a quaternary ammonium group or having an anionic functionality, such as sulphonates, sulphates, particularly carboxylic acids and their derivatives. The ionic monomer is preferably present in a quantity of approximately 0.2 to 10.0 wt. %, based on the total monomer quantity of the particular phase.

In order to bring about a stabilization of the heterogeneous morphology in the vinyl acetate-ethylene latex particles according to the invention, additional monomers with crosslinking reactivity can be present. These can be known, crosslinking monomers, such as e.g. vinyl (meth)acrylates, divinyl adipates, allyl (meth)acrylates, diallylphthalates, triallylcyanurates, ethylene glycol di(meth)acrylates, butane diol di(meth)acrylates and hexane diol di(meth)acrylates.

The vinyl acetate-ethylene latex particles with heterogeneous morphology can be present both in the form of aqueous dispersions and in the form of redispersible powders through a corresponding removal of the water. An appropriate form for the intended use can always be chosen.

The invention also relates to a process for the production of aqueous dispersions of copolymer latex particles with heterogeneous morphology by copolymerizing monomers in the form of ethylene, vinyl acetate and optionally further monomers, whilst incorporating protective colloids, initiators and optionally surfactants, comprising the following stages:

(1) emulsion polymerization of vinyl acetate in the presence of protective colloids, initiators and optionally surfactants, optionally in the presence of ethylene and in the case of ethylene addition the ethylene pressure is set below 50 bar and (2) continued emulsion polymerization with vinyl acetate by (a) adding ethylene in a quantity such that the ethylene pressure rises to above approximately 60 bar or (b) addition of an ionic monomer and optionally ethylene.

This process permits the planned setting of the heterogeneous morphology of the copolymerizate latex particles according to the invention through precisely respecting the above parameters. In stage (1) vinyl acetate is emulsion polymerized in the presence of protective colloids, initiators and optionally surfactants, optionally accompanied by the supply of ethylene and when ethylene is added the ethylene pressure is always kept below 50 bar. This ethylene pressure of 50 bar is a critical value and must be maintained in order to obtain the desired heterogeneous morphology.

The emulsion polymerization of vinyl acetate and optionally present ethylene is carried out accompanied by the addition of protective colloids and optionally surfactants, such as emulsifiers, as stabilizers. The stabilizers in the form of protective colloids and/or emulsifiers selectable according to the invention is subject to no restrictions. Emulsifiers usable according to the invention are nonionic emulsifiers, such as e.g. alkyl alcohol DE 15 or 25 (DE=degree of ethoxylation), particularly $C_{13}$-alcohol DE 15 or 25, alkyl phenol DE 10 or 50, particularly nonyl phenol DE 10 or 50, sorbitan fatty acid esters, ethoxylated fatty acid esters, glycerol fatty acid esters, ethoxylated alkyl amines; anionic emulsifiers, such as ammonium, sodium or calcium salts of various fatty acids, alkyl aryl sulphonic acids, alkyl sulphonates, alkyl ether sulphates, alkyl sulphate esters, ethoxylated alkyl ether sulphonates, ethoxylated alkyl allyl ether sulphonates, alkyl phenol ether sulphates, dialkyl sulphosuccinates and cationic emulsifiers, such as in particular alkyl ammonium acetate, quaternary ammonium group-containing compounds and pyridinium compounds.

As protective colloids use can be e.g. be made of polyethylene oxide, starch and starch derivatives, gelatin, casein and other water-soluble proteins, water-soluble cellulose derivatives, such as hydroxyethyl cellulose, polysaccharides, water-soluble polyacrylates, such as acrylic acid copolymerizates, ethylene oxide-propylene oxide block copolymer, polyvinyl alcohol and/or polyvinyl pyrrolidone and functionalized polyvinyl alcohols, such as acetoacetolyzed polyvinyl alcohol. Suitable protective colloids are also described in Houben-Weyl, Methoden der organischen Chemie, vol. XIV/1, Makromolekulare Stoffe, Georg Thieme Verlag, Stuttgart, 1961, pp 411–420. Particularly preferred protective colloids in the present invention are polyvinyl alcohol, cellulose derivatives, starch derivatives and/or polyvinyl pyrrolidone, polyvinyl alcohol being particularly preferred. It can be used in partly hydrolyzed form, i.e. with different polyvinyl acetate contents in the range of approximately 5 to 20%. The monomer used in stage (1) can also be grafted onto the protective colloid, although this is not absolutely necessary. In a preferred embodiment the protective colloid is used in a quantity of approximately 2.0 to 20 wt. %, based on the total monomer quantity.

It is pointed out that ethylene need not be present in stage (1), so that the phase resulting from stage (1) can essentially only be built up of vinyl acetate and optionally further monomers. If ethylene is additionally added, it is vital to maintain the ethylene pressure below 50 bar and preferably between approximately 10 and approximately 49 bar. If ethylene is used in stage (1) there are preferably approximately 0.01 to 0.5 parts by weight ethylene for 1 part by weight vinyl acetate.

In the following stage (2) two alternative process variants are possible. Through the choice of one of the two variants it is possible in planned manner either to perform a core-shell or an inverse core-shell polymerization. According to variant (a) ethylene is added in a quantity such that at the start of addition the ethylene pressure is set at above approximately 60 bar. However, this does not mean that the ethylene pressure throughout the emulsion polymerization in stage (2) is kept at or in the range of this value. Following the initial ethylene addition with an addition pressure of over approximately 60 bar, the ethylene pressure continuously drops, because the ethylene supplied is consumed by the polymerization process. Working preferably takes place in stage (2) under an ethylene initial pressure of approximately 61 to approximately 125 bar. If the polymer produced in stage (1) is grafted on the protective colloid, with said inventive variant an inverse core-shell polymerization is performed, i.e. the phase resulting from stage (1) is the outer phase in the vinyl acetate-ethylene latex particles obtained and the phase resulting from stage (2), variant (a) always becomes the inner phase of the vinyl acetate-ethylene latex particles.

If in the inventive process variant (b) is chosen, emulsion polymerization is continued accompanied by the addition of one or more ionic monomers and optionally additional ethylene. If stage (1), as described hereinbefore, is followed by variant (2) (b), a core-shell polymerization is performed. This means that the phase produced in stage (1) becomes the inner phase and the phase produced in stage (2) (b) becomes the outer phase. If an ionic monomer is used, then the outer phase is always the hydrophilic phase.

Thus, not only can the ethylene and vinyl acetate content of the individual phases be set in variable manner in the indicated ranges, but by the choice of the described process conditions it is possible in planned manner to produce the desired heterogeneous morphology of the copolymerizate latex particles according to the invention.

Emulsion polymerization can also take place using a seed latex, which can be present in a quantity of approximately 0.1 to 20 wt. %, based on the total monomer weight. In said so-called seed polymerization, which is particularly suitable for producing monodisperse latices, a latex with a uniform particle size is firstly introduced. The monomers to be polymerized are dosed into said seed latex in the monomer feed procedure. Polymerization is performed in such a way that the initial latex particles increase in volume, whilst maintaining the monodispersity of the system, but do not increase in numbers. The number of particles is proportional to the quantity initially introduced and a narrow particle size distribution is obtained.

Fundamentally, the process according to the invention can be performed continuously, semicontinuously or as a batch process. It is also clear that for performing the process of the invention account must be taken of the fundamental aspects of an emulsion polymerization. Thus, e.g. radical initiators are used for performing the polymerization. No relevant limitations exist in the present invention when choosing initiators. The radical initiators used according to the invention are either water-soluble or monomer-soluble. Suitable water-soluble initiators are sodium, potassium and ammonium peroxodisulphate, hydrogen peroxide and water-soluble azo compounds such as 2,2'-azobis(2,-amidinopropane dihydrochloride), 2,2'-azobis [2-methyl-N-(2-hydroxethyl)-propionamide] and 2,2'-azobis[2-(2-imidazoline-2-yl)- propane]-dihydrochloride. Suitable monomer-soluble initiators are organic hydroperoxides, such as tert butyl hydroperoxide, pinane hydroperoxide, p-menthane hydroperoxide, cumene hydroperoxide and diisopropyl phenyl hydroperoxide, organic peroxide such as dibenzoyl peroxide, dilauryl peroxide and diacetyl peroxide, as well as monomer-soluble azo compounds, such as azoisobutyronitrile. Mixtures of initiators can also be used.

In place of a radical initiator, it is also possible to use an initiator system formed from a radical initiator of the above-described type and a water-soluble reducing agent. The actual radical initiator is consequently formed during polymerization, which can e.g. take place by thermal decomposition of the above initiator, or by reacting the initiator with an aqueous reducing agent. The water-soluble reducing agents act as activators for the initiators. Suitable reducing agents are ascorbic acid, sodium, potassium and ammonium sulphite, bisulphite and metabisulphite, sodium formaldehyde sulphoxylate, tartaric acid, citric acid and glucose. They can be used in combination with a heavy metal salt. The reducing agents are generally used in a quantity of 0.01 to 2 wt. %, based on the total monomers added. They are generally dosed in during polymerization. The initiators or initiator combinations are generally used in a quantity of 0.01 to 2 wt. %, based on the total monomers. Particular preference is given to sodium, potassium and ammonium persulphate, hydrogen peroxide and tert butyl hydroperoxide combined with a reducing agent, e.g. sodium formaldehyde sulphoxylate or sodium bisulphite.

As a function of the use conditions, conventional additives can be concomitantly used. Examples are thickeners, pigments, flameproofness-increasing materials, fillers, reinforcing agents, film forming aids, antioxidants, fungicides, foam inhibitors, plasticizers, preservatives, wetting agents, rheology modifying agents, resins, adhesion aids, antiblocking agents, etc., which can be added in conventional quantities.

According to the invention, dispersion preparation can also take place without emulsifier addition and optionally a small amount of emulsifier can be used. The proportion of the emulsifier used is appropriately approximately 0.2 to 3 wt. %.

Polymerization is preferably performed between approximately 40 and 100° C., particularly between approximately 60 and 90° C. The temperature can e.g. depend on the initiator system used. In individual cases the starting temperature is preferably approximately 70° C. The evolution of heat due to the exothermic reaction during polymerization can be used for setting the reaction temperature between 80 and 90° C. and optionally cooling may be required so as not to exceed the indicated temperature range. It is also possible to remove all the quantity of heat produced, in order to maintain or even drop below the initial temperature of approximately 70° C. during the reaction. In individual cases working can take place in an autoclave, which gives a possibility to perform polymerization at above 100° C. Preferably in stage (1) the temperature is approximately 40 to 100° C. and in stage (2) approximately 60 to 100° C.

Apart from the dispersions produced according to the invention, the vinyl acetate-ethylene latex particles with heterogeneous morphology can also be present in the form of a redispersible powder, obtainable by corresponding water removal from the above-described aqueous dispersions. The removal of the water, i.e. the drying of the dispersion, more particularly takes place by spray or freeze drying. A particularly favourable process for drying the aqueous dispersions is the spray drying process, in which the aqueous dispersion is sprayed into a hot air flow and dewatered. Preferably the drying air and the sprayed, aqueous dispersion flow in the same direction through the dryer. The redispersible powder can be used as a finished, pulverulent mixture, which only has to be mixed with water. As a function of the intended use, the powder can be redispersed in the water or in a more or less concentrated form.

The vinyl acetate-ethylene latex particles with heterogeneous morphology in the form of an aqueous dispersion or a redispersible powder according to the present invention have numerous possible uses, e.g. in composite and coating mortars, cement paints and plastics, plastics-containing, cement-bonded systems, particularly in mortars, and plastics-bonded, cement-free binders, particularly in cement-free mortars, gypsum mortars, primers, plasters, carpet, wood, powder and floor adhesives, as well as in wallpaper pastes, disperse powder dyes and glass fibre composite systems. The aqueous dispersions according to the invention and the latex particles obtainable from them by drying, particularly in the form of redispersible powders, are preferably suitable for modifying cement building adhesives, particularly for improving the processability and for increasing the waterproofness. Apart from a preferred use in tile adhesives, the use in cement-containing products of a general nature is important.

The invention leads to numerous advantages. The latex particles according to the invention are characterized by a very flexible, variable composition with respect to the vinyl acetate and ethylene monomers and virtually random ratios can be set within the limits of the described ethylene content. The heterogeneous morphology, i.e. which phase serves as the outer phase and which serves as the inner phase in the ethylene-vinyl acetate latex particles obtained, can be set by the choice of the process parameters. This makes it possible to influence in planned manner the desired characteristics of the latex particles with heterogeneous morphology or to modify them in a planned manner. This permits a control of the characteristics profiles of the substrates to be modified through the improved action of the added particles. In the end products are obtained very favourable characteristics, such as improved processability, better setting behaviour (adhesion), good water resistance and higher storage stability. Thus, both the product implementation and handlability are significantly improved compared with other, heterogeneous vinyl acetate-ethylene latex structures, so that the products produced according to the invention are far superior to conventional, prior art products. The inventively modifiable latex morphology consequently leads to surprising characteristics of the latex particles.

The invention is described in greater detail hereinafter relative to examples, which are not intended to restrict the teaching according to the invention. Within the inventive disclosure, further embodiments are clearly possible.

EXAMPLE

Example 1

Polymerization is performed in two stages. The first stage consists of vinyl acetate and approximately 25% of the total vinyl acetate quantity is polymerized. In the second stage a copolymer of vinyl acetate and ethylene is produced.

Stage 1:

In a 10 litre pressure reactor with temperature control device and stirrer was placed the solution set at a pH-value of 4.0 to 4.3 using phosphoric acid and consisting of 348 g of a 25% aqueous polyvinyl alcohol solution of a polyvinyl alcohol with a viscosity of the 4% aqueous solution at 20° C. of approximately 5.5 mPas and a degree of saponification of approximately 88 mole %, 699 g of a 10% aqueous polyvinyl alcohol solution of a polyvinyl alcohol with a viscosity of the 4% aqueous solution at 20° C. of approximately 23 mPas and a degree of saponification of approximately 88 mole %, 20.0 g of Triton X-405 (polyoxyethylene octyl phenyl ether, union carbide), 4.0 g Tamol 850 (Rohm & Haas), 8.8 g of a 1% iron sulphate solution and 1660 g of water. The reactor was then scavenged with nitrogen and the stirrer set to 550 r.p.m. After adding 850 g of vinyl acetate the reactor was closed and scavenged twice with nitrogen (1.5 to 2.5 bar) and once with ethylene (3.5 bar) in order to substantially remove all the oxygen. The reactor content was then heated to 50° C. and for apparatus reasons the ethylene pressure in the reactor was set to 7 bar and balanced for 20 minutes.

The reaction was then started by a parallel feed of in each case 80 ml/h of an initiator solution 1, consisting of 10 g of a 30% aqueous hydrogen peroxide solution and 210 g of water, and an initiator solution 2 consisting of 10 g of sodium formaldehyde sulphoxylate, 0.6 g of sodium acetate and 210 g of water. Following the start of polymerization the initiator solutions were dosed in such a way that the reactor temperature reached 79° C. within about 20 minutes. The polymerization temperature was maintained at between 74 and 79° C. for 1 hour, during which 46% of the initiator solutions were consumed. The reaction mixture was then cooled to 50° C. A dispersion sample taken revealed 26.2% solids.

Stage 2:

Over a one hour period 2550 g of vinyl acetate were dosed into the reactor at 50° C. Following the addition of half, the ethylene pressure was raised to 48 bar. After adding the remaining vinyl acetate the ethylene pressure was set at 61 bar and balanced for 10 minutes. The polymerization reaction was restarted through fresh initiator solutions, the initiator solution 3 consisting of 37.0 g of a 70% aqueous tert butyl hydrogen peroxide solution and 630 g of water and initiator solution 4 of 23.6 g of sodium formaldehyde sulphoxylate, 1.6 g of sodium acetate and 630 g of water. The reaction temperature was set at 82 to 89° C. On reaching a residual vinyl acetate quantity of below 2.0% (after approximately 2.5 hours) and the consumption of 80% of the initiator solutions, the reaction mixture was cooled and transferred at 60° C. into a degassing container, where the dispersion was freed from unreacted ethylene. By adding the remaining initiator solutions 3+4 the residual vinyl acetate content was reduced to below 0.5%. The solids represented 55.6%, the viscosity was 1790 mPas (Brookfield, 10 r.p.m. using spindle 3), the pH-value was 3.5 and the glass transition temperatures were at −4.8 and +29.5° C.

Example 2

Example 1 was repeated, but no Triton X-405 was used and in the first stage 1700 g of vinyl acetate were polymerized, corresponding to 50% of the total quantity. The reaction temperature was between 74 and 82° C. and 50% of initiator solutions 1+2 were consumed. At the end of the first stage the solids represented 38.7%. As in example 1, a copolymer of vinyl acetate and ethylene was produced in the second stage. Over a one hour period 1700 g of vinyl acetate were dosed in and the ethylene pressure was set at 61 bar. The reaction time was 75 minutes. The solids amounted to 56.8%, the viscosity was 3300 mPas, the pH-value was 4.0 and the glass transition temperatures were −10.6 and +27.9° C.

Example 3

Example 1 was repeated, but no Triton X-405 was used and the ethylene pressure was set at 49 bar prior to the start of the first polymerization phase. Initiator solution 1 consisted of 37.6 g of a 30% aqueous hydrogen peroxide solution and 840 g of water and initiator solution 2 of 33.8 g of sodium formaldehyde sulphoxylate, 2.4 g of sodium acetate and 840 g of water. The reactor temperature was kept at between 82 and 85° C. for 65 minutes and 38% of initiator solutions 1+2 were dosed in. At the end of the first stage the solids represented 29%. Whilst the reaction temperature was left at 82 to 85° C., 2550 g of vinyl acetate were dosed in over 75 minutes. The polymerization reaction went on by continuing the initiator feeds 1+2 over approximately 3.5 hours, 75% of the initiator solutions being consumed. The solids represented 50.4%, the viscosity was 1050 mPas, the pH-value 3.5 and the glass transition temperatures +8.3 and +27.9° C.

Example 4

Example 3 was repeated and in the first stage 1700 g of vinyl acetate were polymerized, which corresponds to 50% of the total quantity, and prior to the start of the first polymerization stage the ethylene pressure was set at 49 bar. The reactor temperature was kept at between 82 and 85° C. for 40 minutes and 28% of initiator solutions 1+2 were dosed in. At the end of the first stage the solids represented 40.8%.

Whilst the reaction temperature was left at 82 to 85° C., 1700 g of vinyl acetate and 31 g of sodium vinyl sulphonate (SVS, 25% aqueous solution) were dosed in over 85 minutes. The polymerization reaction was moved on through the continuation of initiator feeds 1+2 over a period of 170 minutes, 97% of the initiator solutions being consumed. The solids represented 57.0%, the viscosity was 2400 mPas, the pH-value 3.8 and the glass transition temperatures +0.9 and +19.2° C.

Comparison Example 1

Example 1 was repeated, but the entire vinyl acetate quantity (3400 g) was added in one batch. Initiator solution 1 consisted of 37.2 g of a 30% aqueous sodium peroxide solution and 840 g of water and initiator solution 2 of 33.6 g of sodium formaldehyde sulphoxylate, 2.4 g of sodium acetate and 840 g of water. The ethylene pressure was set at 38 bar at 50° C. The reactor temperature was kept at between 77 and 83° C. for 150 minutes. The solids represented 56.1%, the viscosity was 1730 mPas, the pH-value 4.0 and the glass transition temperature +8.4° C.

Example 5

The dispersions of examples 1 to 4 were tested in a customer mortar formulation, accompanied by the addition of 3.3% of dispersion (solids fraction) and a total of 23% water, followed by mixing. The mortar obtained was applied to a "Seekiefer" (10×10 cm) wooden board and subsequently stoneware tiles (10×10 cm) were placed in the mortar bed. After 7 days under normal climatic conditions (23° C. and 50% relative atmospheric humidity) the shear adhesion strengths were measured based on ANSI A118.4. The results are summarized in the following table 1:

TABLE 1

| Shear adhesion strengths based on ANSI A118.4 | | |
|---|---|---|
| Dispersion | Polymer base | Shear adhesion strength |
| Ex. 1 | VA/EVA | 7.9 kg/cm$^2$ |
| Ex. 2 | VA/EVA | 8.9 kg/cm$^2$ |
| Ex. 3 | EVA/VA | 5.5 kg/cm$^2$ |
| Ex. 4 | EVA/VA + SVS | 7.8 kg/cm$^2$ |
| Comp. Ex. 1 | EVA | 4.6 kg/cm$^2$ |

The values obtained in table 1 make it clear that characteristics can be obtained in planned manner using the process according to the invention and are dominated by the corresponding phases. Thus, excellent characteristics are obtained in the final applications.

What is claimed is:

1. A protective colloid-stabilized copolymer latex particle comprising a vinyl acetate-ethylene heterogeneous polymer comprising
    a) an outer phase polymer comprising vinyl acetate and 0–40 weight percent of ethylene, based on the monomers of the outer phase; and
    b) an inner phase polymer comprising vinyl acetate and 0–40 weight percent of ethylene, based on the monomers of the inner phase;

wherein said latex particle comprises less than 30 weight percent by weight of ethylene based on the total amount of monomer, wherein at least one of the two phases comprises ethylene, and wherein the outer and inner phases have different glass transition temperatures.

2. The protective colloid-stabilized copolymer of claim 1 wherein said latex particle comprises 2 to 30 weight percent of ethylene, based on the total monomer amount.

3. The protective colloid-stabilized copolymer of claim 1 wherein said latex particle comprises 5 to 25 weight percent of ethylene, based on the total monomer amount.

4. The protective colloid-stabilized copolymer of claim 1 wherein the outer phase comprises a hydrophilic polymer having a Tg of from 20 to 35° C., and the inner phase comprises a hydrophobic polymer having a Tg of from −40 to +20° C.

5. The protective colloid-stabilized copolymer of claim 1 wherein the weight ratio of the inner phase to the outer phase is from 95:5 to 5:95.

6. The protective colloid-stabilized copolymer of claim 1 wherein the weight ratio of the inner phase to the outer phase is from 75:25 to 40:60.

7. The protective colloid-stabilized copolymer of claim 1 wherein said latex particle further comprises at least one additional monomer selected from the group consisting of aliphatic vinyl ($C_3$–$C_{20}$)-carboxylic esters, ($C_1$–$C_{20}$)-acrylic esters, methacrylic esters, maleic diesters of aliphatic ($C_1$–$C_{20}$)-alcohols, sulphonate or sulphonic acid monomers, $\omega,\tau$-unsaturated carboxylic acids, N-methylol monomers, ($C_1$–$C_{20}$)-alkenyl (meth)acrylic esters, cationic monomers, and crosslinking monomers in the form of radical reacting di- and/or triolefins.

8. The protective colloid-stabilized copolymer of claim 7 herein said aliphatic vinyl ($C_3$–$C_{20}$)-carboxylic esters, ($C_1$–$C_{20}$)-acrylic esters, or methacrylic esters are substituted with epoxy groups, hydroxyl groups, or a mixture thereof.

9. The protective colloid-stabilized copolymer of claim 1 wherein said latex particle further comprises a crosslinking monomer.

10. The protective colloid-stabilized copolymer of claim 1 wherein said outer phase further comprises from 0.2 to 10 percent by weight of an ionic monomer.

11. A pulverulent comprising the protective colloid-stabilized copolymer of claim 1.

12. A process for the production of aqueous dispersions of vinyl acetate-ethylene copolymers having a heterogeneous morphology comprising:
  1) forming a first stage emulsion polymer comprising vinyl acetate in the presence of a protective colloid; and
  2) forming a second phase emulsion polymer comprising vinyl acetate and a second monomer.

13. The process of claim 12 wherein said first stage emulsion polymer further comprises ethylene, wherein the ethylene pressure is below 50 bar.

14. The process of claim 12 wherein said second phase, second monomer is ethylene wherein the ethylene pressure is above 60 bar.

15. The process of claim 12 wherein said second phase, second monomer is an ionic monomer.

16. The process of claim 15 wherein said second monomer further comprises ethylene.

17. The process of claim 13 wherein the ethylene pressure is from 10 to 49 bar during the first stage emulsion polymerization process.

18. The process of claim 14 wherein the ethylene pressure in the second stage is from 61 to 125 bar.

19. The process of claim 12 wherein the temperature within the first stage emulsion polymerization is from 40 to 100° C., and the temperature within said second stage polymerization is from 60 to 100° C.

20. The process of claim 13 wherein said first stage emulsion polymer contains 0.01 to 0.5 parts by weight of ethylene for each one part of vinyl acetate.

21. The process of claim 12 wherein said protective colloid is selected from the group consisting of polyvinyl alcohol, cellulose derivatives, starch derivatives, polyvinyl pyrrolidone, and mixture thereof.

22. The process of claim 12 wherein said protective colloid is present at from 2.0 to 20 weight percent, based on the total amount of monomer.

23. The process of claim 12 further comprising forming said first stage emulsion polymer using 0.1 to 20 weight percent of a seed latex, based on the total amount of monomer.

24. The process of claim 12 further comprising the step of drying said vinyl acetate-ethylene copolymer to form a redispersible powder.

25. The process of claim 24 wherein said drying comprises spray drying or freeze drying.

26. A formulation comprising the copolymer latex particle of claim 1, wherein said formulation comprises a composite mortar; coating mortar, cement dye; cement adhesive; plastic-containing, cement-bound system; plastic-bound, cement-free binder; gypsum mortar; primer; plaster; carpet, wood, powder and floor adhesive; wallpaper paste; disperse dye; or glass fibre composite system.

* * * * *